US009887859B2

(12) United States Patent
Kaneta et al.

(10) Patent No.: US 9,887,859 B2
(45) Date of Patent: Feb. 6, 2018

(54) DATA ALIGNMENT IMPLEMENTED IN A FIELD PROGRAMMABLE GATE ARRAY (FPGA) DEVICE

(71) Applicant: Ross Video Limited, Iroquois (CA)

(72) Inventors: Scott Raymond Kaneta, Virginia Beach, VA (US); Desmond Leslie Ambrose, Ottawa (CA); Christopher Jason Williams, Chesapeake, VA (US)

(73) Assignee: Ross Video Limited, Iroquois (CA)

( * ) Notice: Subject to any disclaimer, the term of this patent is extended or adjusted under 35 U.S.C. 154(b) by 0 days.

(21) Appl. No.: 15/259,910

(22) Filed: Sep. 8, 2016

(65) Prior Publication Data

US 2017/0070339 A1     Mar. 9, 2017

Related U.S. Application Data

(60) Provisional application No. 62/215,690, filed on Sep. 8, 2015.

(51) Int. Cl.
| | |
|---|---|
| *H04L 25/03* | (2006.01) |
| *H04L 25/14* | (2006.01) |
| *H04N 21/236* | (2011.01) |
| *H04N 21/434* | (2011.01) |
| *H04L 7/02* | (2006.01) |

(52) U.S. Cl.
CPC .............. *H04L 25/03* (2013.01); *H04L 25/14* (2013.01); *H04N 21/23602* (2013.01); *H04N 21/4342* (2013.01); *H04L 7/02* (2013.01)

(58) Field of Classification Search
CPC . H04L 25/03; H04L 25/14; H04L 7/02; H04L 7/0016; H04N 21/23602; H04N 21/4342
See application file for complete search history.

(56) References Cited

U.S. PATENT DOCUMENTS

| | | | | |
|---|---|---|---|---|
| 5,253,254 A | * | 10/1993 | Roberts ................. | H04J 3/0608 375/260 |
| 6,738,935 B1 | * | 5/2004 | Kimmitt ............... | H04L 1/0045 370/464 |

(Continued)

OTHER PUBLICATIONS

Arria V Device Handbook, vol. 1: Device Interfaces and Integration, Altera, Jan. 23, 2015.

(Continued)

*Primary Examiner* — Jean B Corrielus
(74) *Attorney, Agent, or Firm* — Wolf, Greenfield & Sacks, P.C.

(57) ABSTRACT

In an FPGA device, an FPGA receiver is configured to receive a serial signal, to deserialize the received serial signal into a parallel signal, and to align parallel words in the parallel signal. Programmable FPGA fabric in the FPGA device is coupled to receive the parallel signal from the FPGA receiver. The programmable FPGA fabric is also configured to descramble data words from the parallel words in the parallel signal, to perform a phase detection operation based on the descrambled data words, to generate an alignment control signal based on the phase detection operation, and to feed back the alignment control signal to the FPGA receiver to control alignment of the parallel words in the parallel signal. The serial signal is a Serial Digital Interface (SDI) signal in an embodiment.

20 Claims, 7 Drawing Sheets

(56) References Cited

U.S. PATENT DOCUMENTS

| | | | |
|---|---|---|---|
| 8,681,839 B2* | 3/2014 | Bulzacchelli | H04L 25/14 375/220 |
| 9,524,759 B2* | 12/2016 | Nam | H03K 5/1502 |
| 2005/0121789 A1* | 6/2005 | Madurawe | H01L 27/0207 257/758 |
| 2009/0161738 A1* | 6/2009 | Carvalho | H04L 25/14 375/219 |
| 2009/0303381 A1* | 12/2009 | Setya | G06F 3/14 348/441 |
| 2012/0154185 A1* | 6/2012 | Shoor | H04J 3/0608 341/100 |
| 2012/0250436 A1* | 10/2012 | Cho | H04L 25/0278 365/198 |
| 2014/0226064 A1* | 8/2014 | Hamamura | H04N 7/08 348/441 |

OTHER PUBLICATIONS

RP 168-2009: SMPTE Recommended Practice Definition of Vertical Interval Switching Point for Synchronous Video Switching, The Society of Motion Picture and Television Engineers, Jul. 17, 2009.

SMPTE 425M-2006: SMPTE Standard for Television—3 Gb/s Signal/Data Serial Interface—Source Image Format Mapping, The Society of Motion Picture and Television Engineers, Apr. 5, 2006.

SMPTE 274M-2008: SMPTE Standard for Television—1920×1080 Image Sample Structure, Digital Representation and Digital Timing Reference Sequences for Multiple Picture Rates, The Society of Motion Picture and Television Engineers, Jan. 29, 2008.

Amendment 1:2013 to SMPTE ST 12-2:2008: SMPTE Standard Transmission of Time Code in the Ancillary Data Space—Amendment 1, The Society of Motion Picture and Television Engineers, Aug. 29, 2013.

SMPTE ST 125:2013: SMPTE Standard SDTV Component Video Signal Coding 4:4:4 and 4:2:2 for 13.5 MHz and 18 MHz Systems, The Society of Motion Picture and Television Engineers, Sep. 25, 2013.

SMPTE ST 291-1:2011: SMPTE Standard Ancillary Data Packet and Space Formatting, The Society of Motion Picture and Television Engineers, Sep. 23, 2011.

SMPTE ST 296:2012: SMPTE Standard 1280×720 Progressive Image 4:2:2 and 4:4:4 Sample Structure—Analog and Digital Representation and Analog Interface, The Society of Motion Picture and Television Engineers, Apr. 18, 2012.

SMPTE ST 334-1:2015: SMPTE Standard Vertical Ancillary Data Mapping of Caption Data and Other Related Data, The Society of Motion Picture and Television Engineers, Jan. 2, 2015.

SMPTE ST 2082-10:2015: SMPTE Standard 2160—line Source Image and Ancillary Data Mapping for 12G-SDI, The Society of Motion Picture and Television Engineers, Feb. 4, 2015.

* cited by examiner

FIG. 7

DATA ALIGNMENT IMPLEMENTED IN A FIELD PROGRAMMABLE GATE ARRAY (FPGA) DEVICE

CROSS-REFERENCE TO RELATED APPLICATION

The present application is related to, and claims the benefit of, U.S. Provisional Patent Application No. 62/215,690, filed on Sep. 8, 2015, the entire contents of which are incorporated herein by reference.

FIELD

The present disclosure relates generally to data communications and, in particular, to alignment of data within a Field Programmable Gate Array (FPGA) device.

BACKGROUND

In the broadcast audio/video environment, video and audio signals are typically represented in a digital manner. There are many transports which are used to move these signals between devices. One common such transport is known as SDI, or Serial Digital Interface, as specified by the Society of Motion Pictures and Television Engineers (SMPTE) and the International Telecommunications Union (ITU). This signal transport carries audio and video signals, in a serial bitstream, between devices over a variety of media, including coaxial cable or fiber optic cable.

The SDI standards can represent a wide variety of video standards, including National Television System Committee (NTSC), Phase Alternating Line (PAL), High Definition Television (HDTV—1080i, 720p, 1080p), or Ultra-High Definition Television (UHD–2160p). Depending upon the video standard being carried, the data rate of an SDI transport may vary among a number of pre-defined rates, ranging from 270 Mbit/s up to 12 Gbit/s.

Since SDI signals are transmitted on a single transmission line, without a forwarded clock, it is necessary for a device receiving an SDI signal to recover the clock from the incoming signal and to align the serial data stream for proper decoding.

SUMMARY

An FPGA device includes: an FPGA receiver configured to receive a serial signal, to deserialize the received serial signal into a parallel signal, and to align parallel words in the parallel signal; and programmable FPGA fabric coupled to receive the parallel signal from the FPGA receiver, and configured to descramble data words from the parallel words in the parallel signal, to perform a phase detection operation based on the descrambled data words, to generate an alignment control signal based on the phase detection operation, and to feed back the alignment control signal to the FPGA receiver to control alignment of the parallel words in the parallel signal. The serial signal is a Serial Digital Interface (SDI) signal in an embodiment.

The phase detection operation could involve detection of an alignment pattern in the descrambled data words and determination of a phase difference between a phase of the alignment pattern and a current alignment of the parallel words in the parallel signal, in which case the programmable FPGA fabric could be configured to generate the alignment control signal based on the phase difference.

The programmable FPGA fabric could be configured to generate the alignment control signal to control a number of bits to be dropped from the serial signal by the FPGA receiver.

In an embodiment, the FPGA receiver includes a deserializer coupled to a word aligner, and the word aligner has an input to receive the alignment control signal and is configured to perform a bit-slip operation.

The programmable FPGA fabric could be configured to descramble the data words using a Non-Return-to-Zero-Inverted (NRZI) descrambling algorithm.

The alignment pattern is an SDI Timing Reference Signal (TRS) in an embodiment, and the SDI TRS could be detected by the programmable FPGA fabric and the alignment control signal could be fed back to the FPGA receiver to control alignment of the parallel words in the parallel signal, within a switching interval specified by SMPTE RP-168 and SMPTE ST291-1.

A method of configuring an FPGA device involves configuring an FPGA receiver in the FPGA device to receive a serial signal, to deserialize the received serial signal into a parallel signal, and to align parallel words in the parallel signal; and configuring programmable FPGA fabric in the FPGA device to receive the parallel signal from the FPGA receiver, to descramble data words from the parallel words in the parallel signal, to perform a phase detection operation based on the descrambled data words, to generate an alignment control signal based on the phase detection operation, and to feed back the alignment control signal to the FPGA receiver to control alignment of the parallel words in the parallel signal.

Configuring the programmable FPGA fabric to perform a phase detection operation could involve configuring the programmable FPGA fabric to detect an alignment pattern in the descrambled data words and determine a phase difference between a phase of the alignment pattern and a current alignment of the parallel words in the parallel signal, and configuring the programmable FPGA fabric to generate the alignment control signal could involve configuring the programmable FPGA fabric to generate the alignment control signal to control a number of bits to be dropped from the serial signal by the FPGA receiver.

As noted above, the serial signal could be an SDI signal. Configuring the programmable FPGA fabric to descramble the data words could involve configuring the programmable FPGA fabric to apply an NRZI descrambling algorithm.

Another method involves: deserializing, by an FPGA receiver in an FPGA device, a serial signal received by the FPGA receiver, the FPGA receiver deserializing the serial signal into a parallel signal; controlling, by the FPGA receiver, alignment of parallel words in the parallel signal; descrambling, by programmable FPGA fabric in the FPGA device, data words from the parallel words in the parallel signal; performing, by the programmable FPGA fabric, a phase detection operation based on the descrambled data words; generating, by the programmable FPGA fabric, an alignment control signal based on the phase detection operation; and feeding back, by the programmable FPGA fabric, the alignment control signal to the FPGA receiver to control alignment of the parallel words in the parallel signal.

Performing a phase detection operation could involve detecting an alignment pattern in the descrambled data words and determining a phase difference between a phase of the alignment pattern and a current alignment of the parallel words in the parallel signal, in which case generating could involve generating the alignment control signal based on the phase difference, to control a number of bits to be dropped from the serial signal by the FPGA receiver for example.

The method could also involve performing, by the FPGA receiver, a bit-slip operation.

The serial signal could be an SDI signal, as noted above.

In an embodiment, descrambling involves descrambling the data words using an NRZI descrambling algorithm.

The alignment pattern could be an SDI TRS, and the SDI TRS could be detected by the programmable FPGA fabric and the alignment control signal could be fed back to the FPGA receiver to control alignment of the parallel words in the parallel signal, within a switching interval specified by SMPTE RP-168 and SMPTE ST291-1.

Other aspects and features of embodiments of the present disclosure will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION

As noted above, SDI signals are serial signals that are transmitted on a single transmission line without a forwarded clock. A device that receives an SDI signal must recover the clock from the incoming signal and to align the serial data stream for proper decoding. A receiver typically implements a Phase-Locked Loop (PLL) clock recovery circuit, which will generate a clock based on observed transitions of bits in the received signal. In order to ensure that transitions in the signal occur at a reasonable frequency, SDI implements a Non-Return-to-Zero-Inverted (NRZI) scrambling algorithm which ensures a maximum run length of 19 bits between transitions.

Figure 1:
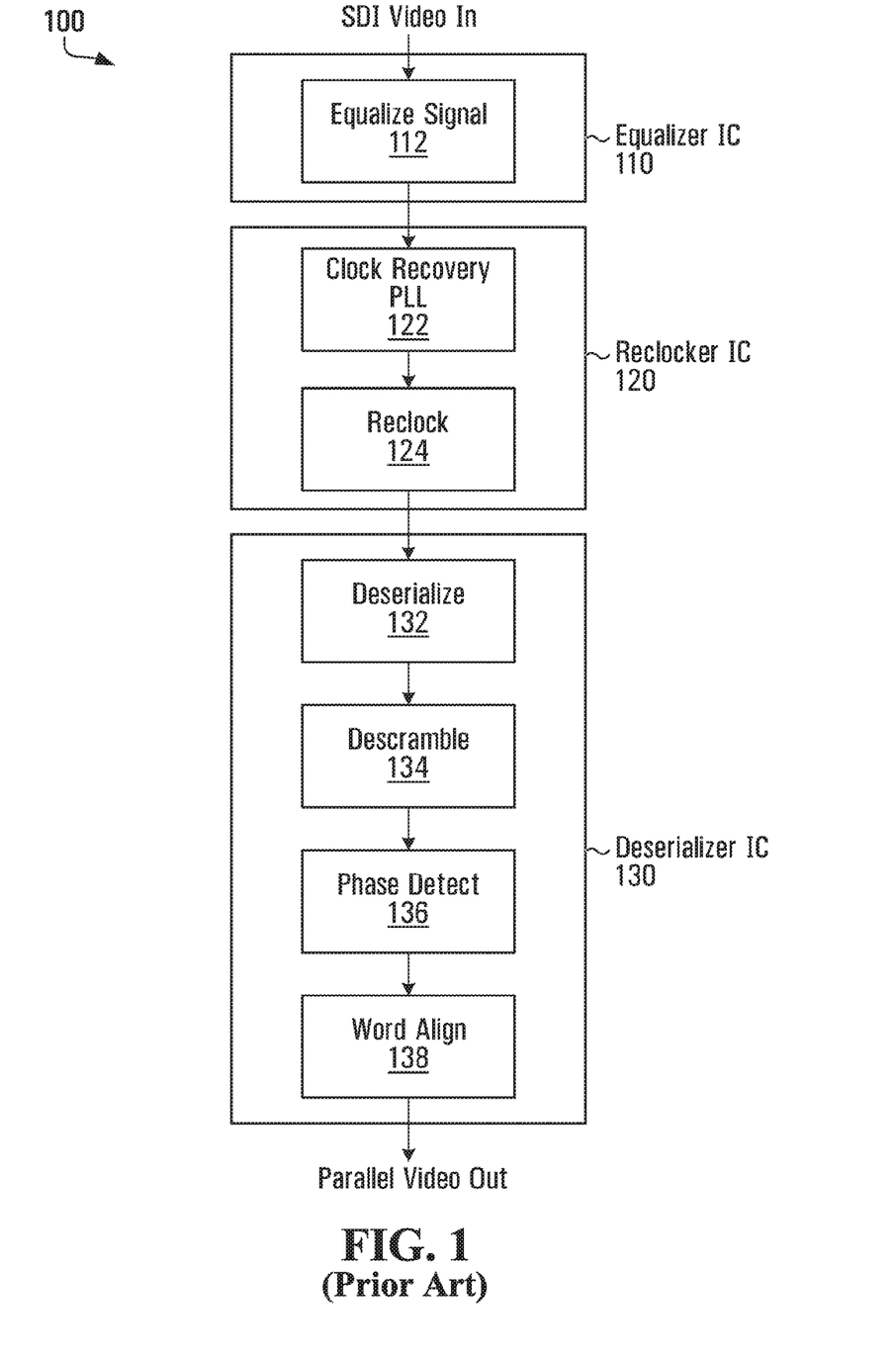
FIG. 1 is a block diagram illustrating an Integrated Circuit (IC)-based SDI receiver.

Early devices which implemented SDI interfaces historically used custom ICs to receive and transmit the serial bitstream. FIG. 1 is a block diagram illustrating an IC-based SDI receiver. The receiver 100 shown in FIG. 1 includes an equalizer IC 110, a reclocker IC 120, and a deserializer IC 130, and functions performed by each IC are also shown for illustrative purposes. The equalizer IC 110 provides a function 112 to equalize the incoming signal to compensate for cable loss, the reclocker IC 120 performs a clock recovery PLL function 122, and a reclock function 124 to reclock the incoming bitstream, and the deserializer IC 130 provides functions to deserialize the bitstream into a parallel word domain at 132, descramble the signal at 134, detect phase at 136, and re-align word boundaries at 138. On a transmitter, these ICs would scramble and serialize the signal and additionally provide a controlled driver suitable to transmit the signal along a cable.

The method for handling SDI signals evolved with the onset of FPGA devices, which integrated high-speed serial transceiver circuits. These transceiver circuits provided a mechanism to receive high-speed serial bitstreams. This resulted in the simplification of the custom integrated circuits, such that only the input equalizer and transmitter's cable driver were required in an FPGA-based implementation. All other functions (clock recovery, reclocking, deserialization, descrambling, serialization, scrambling), could be integrated into the FPGA.

However, FPGA transceivers are not natively designed around the particular implementation of SDI signals. They have been optimized to handle other telecommunication standards which use different data rates and encoding schemes. The receiver on FPGA transceivers typically includes all the features necessary to receive, frame, and descramble signals according to these telecommunication standards, integrating circuit blocks specific to the encoding of these types of signals.

An important distinction with SDI is the NRZI scrambling algorithm. This scrambling algorithm scrambles a 10-bit data word into a 10-bit scrambled codeword. Conversely, many telecommunication standards employ an 8b/10b encoding scheme. In this approach, an 8-bit data word is encoded into a 10-bit code word. This approach advantageously allows known code words and bit patterns to be inserted into the datastream at regular intervals, but has the disadvantage that it requires an additional 25% overhead (2 bits in addition to the 8-bit data word) to achieve this. These code words and bit patterns are useful in determining word boundaries when a signal is deserialized. SDI scrambling has no encoding overhead, but lacking this overhead, no known bit patterns or code words are inserted into the stream.

In an 8b/10b encoded signal, the word boundaries can be determined by examination of the encoded words within a small number of received words (usually less than 10 words). In SDI, since there is no provision for insertion of these additional codewords, the receiver must look for known, uniquely identifiable patterns within the data payload. Fortunately, SDI standards such as SMPTE ST125M (Standard definition), SMPTE ST274M (1080i Hi-def), SMPTE ST296M (720p Hi-def), SMPTE ST425M (1080p Hi-Def), SMPTE ST2082 (Ultra-Hi-Def) do provide for certain uniquely-identifiable word sequences, which are used for alignment or synchronization of the video signal itself. These are known as Timing Reference Signals (TRSs). However, TRS sequences occur infrequently in the payload; generally only twice per video line. A video line may range from approximately 1900 words to over 8000 words, depending upon the video standard. Furthermore, a TRS is a multi-word sequence, ranging from 40 to 320 bits (4 to 32 10-bit words), depending upon the video standard. These sequences are much longer than pattern match buffers available in an FPGA transceiver block. It is not possible to implement alignment detection and word alignment in FPGA transceivers themselves. These features may instead be implemented in FPGA programmable fabric as disclosed herein, rather than in FPGA transceivers themselves.

Figure 2:
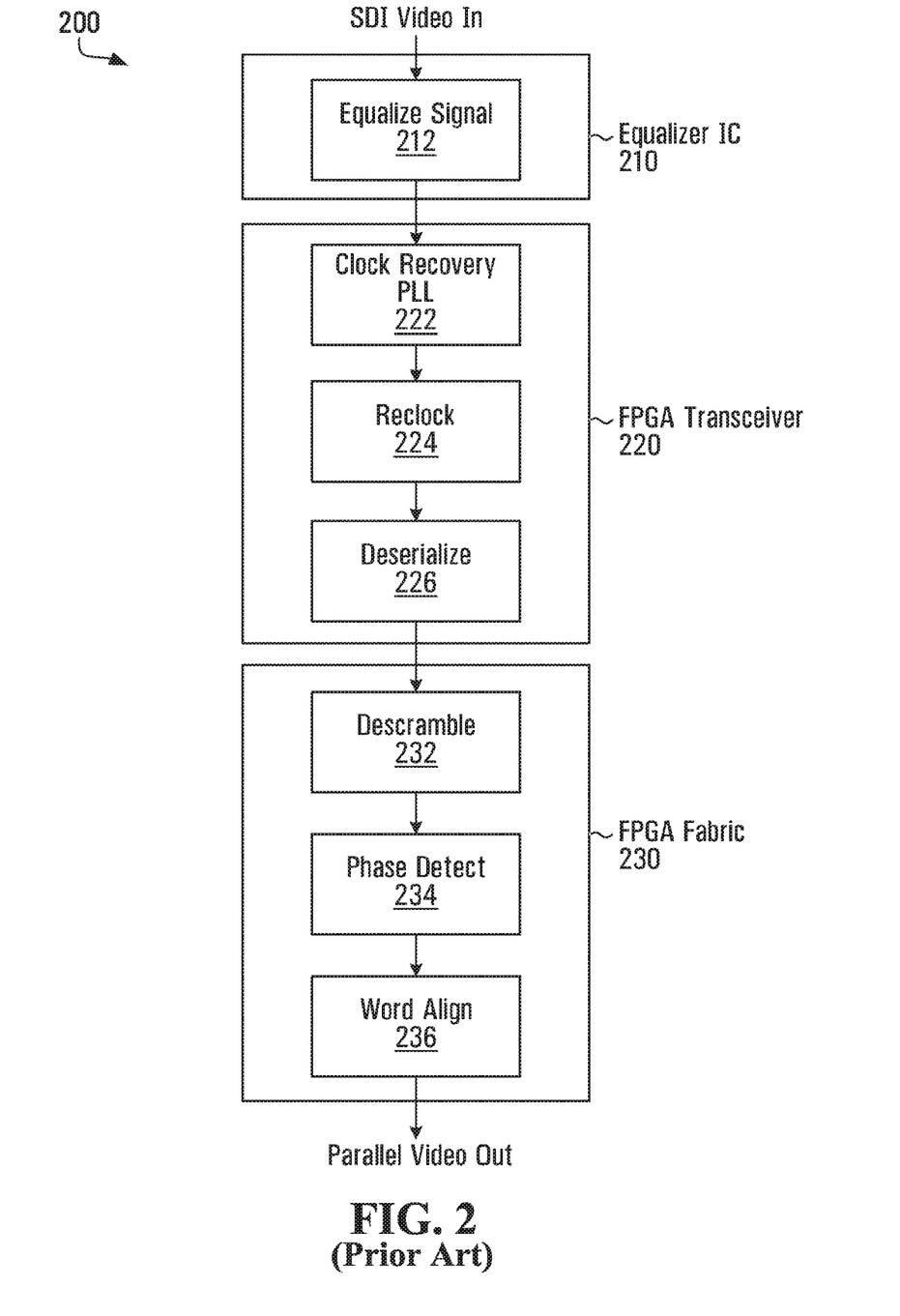
FIG. 2 is a block diagram illustrating an FPGA-based SDI receiver.

FIG. 2 is a block diagram illustrating an FPGA-based SDI receiver. The receiver 200 includes an equalizer IC 210, which like the equalizer IC 110 in FIG. 1 equalizes the SDI signal as shown at 212, to compensate for cable loss. The resultant equalized signal is then passed into an FPGA transceiver 220, where a clock recovery PLL 222 recovers the serial bit clock, and the signal is reclocked as shown at 224, and then deserialized at 226 into a parallel format. However, due to the long nature of the TRS sequence in the case of an SDI signal, there is no mechanism in an FPGA transceiver to detect the phase of the parallel word. Additionally, FPGA transceiver blocks typically do not implement the NRZI descrambling algorithm. Therefore, the scrambled, misaligned parallel word is then passed to logic that has been programmed into the FPGA fabric 230 of the FPGA.

The logic or functionality that in this example is programmed into the FPGA fabric 230 includes logic to implement an NRZI descrambler at 232. Resultant descrambled parallel data is then fed into a phase detector at 234, which hunts in the data stream for the occurrence of a known TRS sequence. Once the TRS sequence or pattern is detected, the phase of this pattern is measured relative to the current word alignment. This measurement is then fed into a word-alignment circuit 236, which bit-shifts the received data words according to this measurement. This bit-shift is typically performed by a barrel-shifter circuit within the FPGA fabric 230. Depending upon the video standard, this shift may be 10 to 80 bits. In older standard-definition formats, data width was 10 bits. High Definition formats (HDTV) implement 20 bits. 3G-SDI (1080p) video formats implement 20 or 40 bits. Ultra-High Definition video formats implement 80 bits. Future formats could have different word lengths, including longer word lengths. For example, SMPTE has defined UHD-2 formats, which could use 160-bits or wider word alignment capability.

The complexity of an n-bit barrel shifter is n-squared, so the size of the circuit grows exponentially with the number of bits. An 80-bit barrel shifter, for example, requires 64 times more logic than a 10-bit barrel shifter. In general, wider words are present in newer video formats which are carried on faster SDI interconnects. As serial standards such as SDI continue to evolve, it is foreseeable that wider word widths will be required, further growing the barrel shifter.

In an embodiment, SDI is used to transport 10-bit video words, but in video equipment for which a 12 GHz internal bus processing structure or "virtual" interface uses 80-bit words. Data words in this example are aligned to the 80-bit virtual interface. For an 80-bit data word, a shift or re-alignment for deserialization could be up to 80 bits, although different shifts could be supported in other embodiments.

Figure 3:
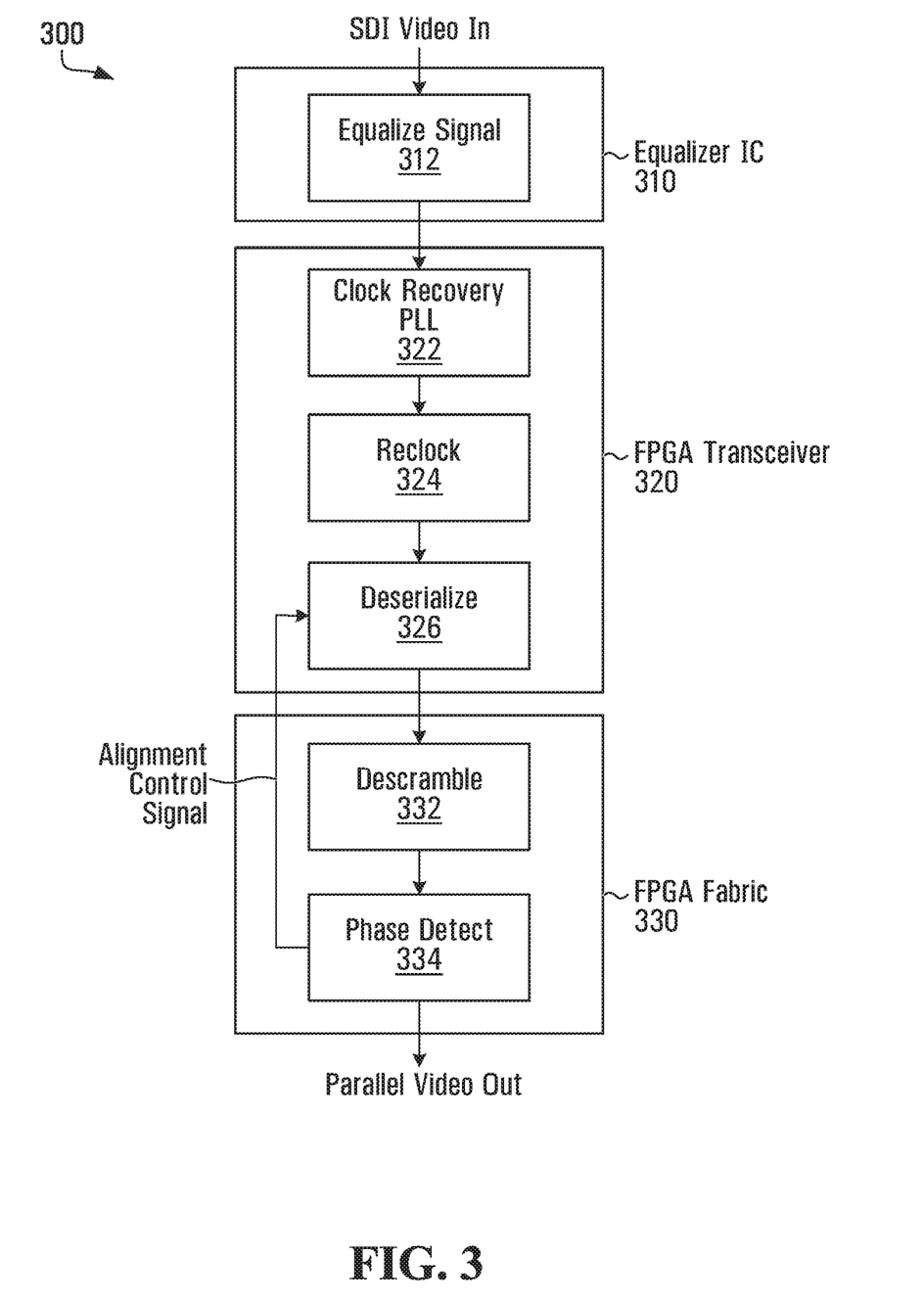
FIG. 3 is a block diagram illustrating an example FPGA-based SDI receiver according to an embodiment.

Referring now to FIG. 3, which is a block diagram illustrating an example FPGA-based SDI receiver 300 according to an embodiment, equalization at 312 is implemented with a discrete equalizer IC 310, as in the receivers 100, 200 in FIGS. 1 and 2. Clock recovery in a PLL at 322, reclocking at 324 by a reclocker, and deserializing at 326 by a deserializer are implemented within the FPGA transceiver 320. The example receiver 300 implements a descrambler at 332, which is an NRZI descrambler in the case of SDI, within the FPGA programmable fabric 330. The descrambler 332 is coupled to feed its output descrambled signal into a phase detector at 334.

In an FPGA, high-speed transceivers are configurable to build receiver and transmitter datapaths. Serial data alignment as disclosed herein concerns receiver datapaths, and accordingly the present disclosure refers primarily to FPGA receivers. Such FPGA receivers could be implemented as discrete elements or collections of elements, but in many implementations it is expected that FPGA receivers will be part of FPGA transceivers which support transmission and reception. Data alignment as disclosed herein need not necessarily impact transmitter operation. Clock recovery, reclocking, and deserializer blocks are examples of transceiver elements that are available in FPGA transceivers for configuration into an FPGA receiver or receive datapath.

An FPGA also includes programmable FPGA fabric. The programmable FPGA fabric is more generally configurable to implement logic or functions, including logic for descrambling, registers and logic for phase detection, and logic for alignment control, for example.

The specific manner in which the FGPA receivers or transceivers and the programmable FPGA fabric are configured or programmed may be implementation-specific. Different FPGA manufacturers, for example, may define different configuration settings or programming controls, for example. In general, an FPGA "load" defines how both FPGA transceiver elements and logic elements of the FPGA fabric are to be configured or programmed.

On a comparison of FIGS. 2 and 3, it can be seen that in FIG. 2, the word align function at 236 is implemented in the FPGA fabric 230, whereas there is no such word alignment in the FPGA fabric 330 in FIG. 3. Instead of providing a barrel shifter or other alignment implementation in the FPGA fabric 330, phase detection at 334 in the example SDI receiver 300 provides an alignment control signal to the FPGA transceiver 320, and specifically to the deserializer at 326 in the example shown. Responsive to the alignment control signal, the deserializer at 326 adjusts alignment of parallel data words in a deserialized serial data stream (i.e., a parallel signal).

Such alignment control or adjustment could be implemented separately from a deserializer in other embodiments. See, for example, FIGS. 4 and 5A.

Figure 4:
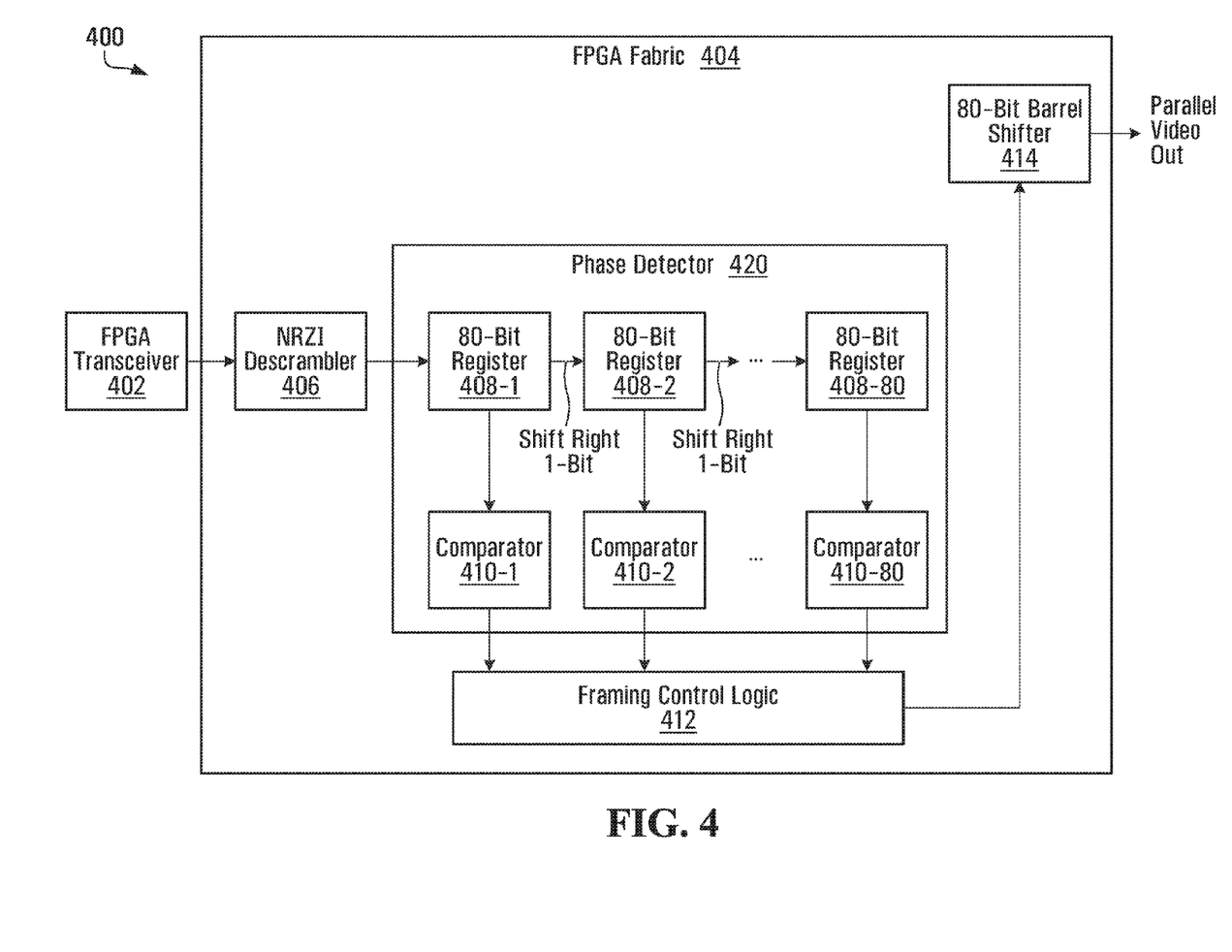
FIG. 4 is a block diagram of another FPGA-based SDI receiver.

FIG. 4 is a block diagram of another FPGA-based SDI receiver 400, which includes an FPGA transceiver 402 and a programmable FPGA fabric 404. An NRZI descrambler 406, framing control logic 412, an 80-bit barrel shifter 414, and a phase detector 420 are all implemented in the FPGA fabric 404. The phase detector 420 includes eighty registers 408-1, 408-2, . . . , 408-80, each of which is 80 bits wide, and eighty 80-bit comparators 410-1, 410-2, . . . , 410-80. The registers 408-1, 408-2, . . . , 408-80, and comparators 410-1, 410-2, . . . , 410-80 enable a search procedure to detect an alignment pattern. When the alignment pattern is found, the framing control logic 412 instructs the barrel shifter 414 to apply an appropriate shift to properly align and output the parallel video signal.

Figure 5A:
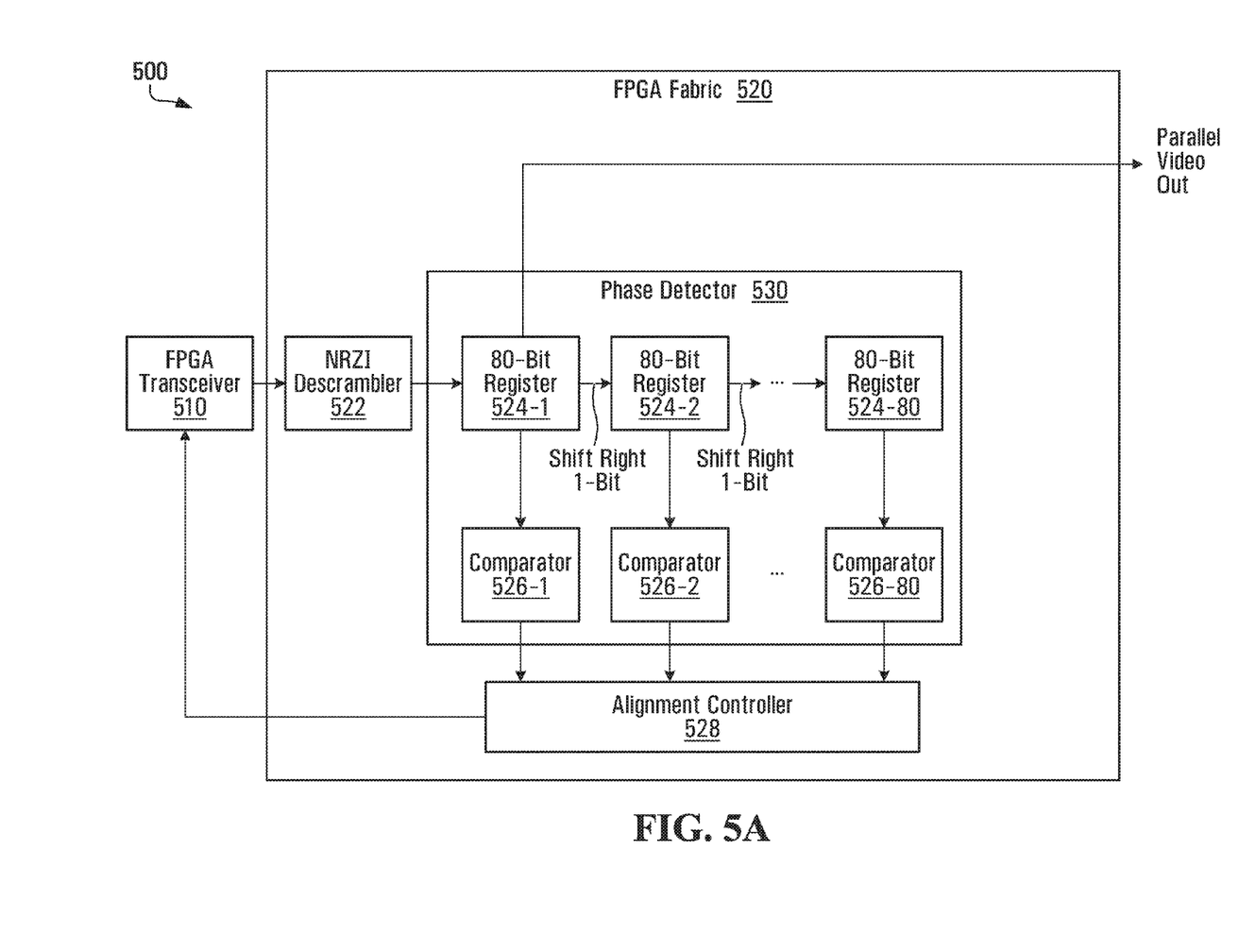
FIG. 5A is a block diagram illustrating an example FPGA-based SDI receiver according to a further embodiment.

FIG. 5A is a block diagram illustrating an example FPGA-based SDI receiver according to a further embodiment. The example SDI receiver 500 in FIG. 5A, like the SDI receiver 400 in FIG. 4, includes an FPGA transceiver 510 and a programmable FPGA fabric 520, with an NRZI descrambler 522 and a phase detector 530 implemented in the FPGA fabric. The phase detector 530 includes eighty registers 524-1, 524-2, . . . , 524-80, each of which is 80 bits wide, and eighty 80-bit comparators 526-1, 526-2, . . . , 526-80, which enable a search procedure to detect an alignment pattern. The phase detector 530 could be implemented and operate in the same manner as the phase detector 420. When the pattern that is being searched for is found by one of the comparators 526-1, 526-2, . . . , 526-80, the alignment controller 528 provides an alignment control signal to the FPGA transceiver 510. There is no barrel shifter in the example SDI receiver 500.

In the example shown, registers 524-1, 524-2, . . . , 524-80 each hold 80 bits, and the 80 bits in each register are offset by one bit relative to the bits in its adjacent register(s). In each processing cycle, the bits in the first 79 registers are effectively shifted to the right by one bit and transferred to the next register, and a new bit is loaded into the first register 524-1. This allows the phase detector 530 to sequentially search the incoming descrambled data words, bit-by-bit, for an 80-bit pattern. When the 80-bit pattern that is being searched for actually appears in the descrambled signal but word alignment is not correct, the 80-bit pattern will eventually align correctly in one of the registers 524-1, 524-2, . . . , 524-80 and be detected by one of the comparators 526-1, 526-2, . . . , 526-80. In the example of an 80-bit word, alignment could only possibly be off by 80 bits, and therefore correct word alignment should be detected within 80 processing cycles of the occurrence of an alignment pattern.

Although the SDI receiver 500 includes a phase detector 530 with eighty 80-bit registers 524-1, 524-2, . . . , 524-80 and eighty 80-bit comparators 526-1, 526-2, . . . , 526-80, this does not necessarily mean that an alignment pattern is limited to 80 bits. In an embodiment, the alignment pattern is 320 bits in length, and the phase detector 530 detects the alignment pattern as a series of four 80-bit constituent patterns. After the first constituent pattern is detected, then the next three constituent patterns must also be detected in order to detect the entire alignment pattern. For example, if the kth register in FIG. 5A contains the first constituent pattern in a certain cycle, then the corresponding kth comparator will detect that pattern. The comparator, or the alignment controller 528, records the detection and on the next processing cycle the kth comparator will be comparing the new contents of the kth register to the second constituent pattern. If the detected first constituent pattern was the beginning of the full alignment pattern, then the contents of the (k−1)th register which were shifted by one bit and loaded into the kth register should now match the second constituent pattern. If so, then the detection is recorded and the kth comparator moves on to the third constituent pattern, and so on. Recording of constituent pattern detections, progressing to the next constituent pattern, and eventually declaring detection of the full alignment pattern could be implemented using a state machine, for example.

In this manner, the same comparator should detect all four constituent patterns if the full alignment pattern actually appears, and the alignment control signal can then be generated and fed back to the FPGA transceiver 510 by the alignment controller 528. Otherwise, the comparator or the alignment controller 528 could be reset to remove any record of detection of a constituent pattern and return to searching for the first constituent pattern.

For this example of a 320-bit alignment pattern that is broken into four 80-bit constituent patterns for processing in an 80-bit virtual interface, the alignment pattern could be out of alignment by a maximum of 80 bits, and thus would be detected within a maximum of 80 cycles in a bit-by-bit search as outlined above. This would also be the maximum phase detection delay for detection of a complete alignment pattern in only one 80-bit word. Once the first constituent pattern in a four-word alignment pattern is detected, the next three constituent patterns should be detected by the same comparator within the next three processing cycles.

In an embodiment, the phase detector 530 and the alignment controller 528 run continuously. Once the alignment control signal based on the phase difference for the alignment pattern is fed back to the FPGA transceiver 510 and the word alignment is adjusted, further alignment adjustments can be made as the phase detector 530 detects any subsequent word mis-alignments based on TRS sequences that occur later in the serial datastream.

Regarding the alignment control signal itself, the number of bits to shift is determined in an embodiment based on the position of the comparator 526-1, 526-2, . . . , 526-80 which detects the pattern. For example, if the alignment pattern, which includes four 80-bit words in an example described in further detail below, is detected by the kth comparator, then the current alignment that was used for deserialization is out of alignment by k bits. The kth comparator, responsive to detecting the alignment pattern, signals the alignment controller 528. The alignment controller 528 determines which comparator 526-1, 526-2, . . . , 526-80 detected the pattern and outputs an alignment control signal to control the FPGA transceiver 510 to apply a k-bit shift to the current word alignment that is used in deserializing the incoming serial data stream. This shift could be applied by dropping k bits from the data stream for example. In an embodiment, the alignment controller 528 signals the FPGA receiver 510 within an FPGA transceiver to drop k bits. This may be done one bit at a time (hence the term "bit-slip"), via assertion of a bit-slip control signal.

As noted above, some FPGA implementations include receivers on FPGA transceivers that provide all the features to receive, frame/align, and descramble signals according to telecommunication standards, integrating circuit blocks specific to the encoding of these types of signals. In such implementations, the bit-slip control is asserted from within the FPGA receiver, since the FPGA receiver handles signal framing/alignment directly. However, as discussed herein FPGA receivers might not be designed to handle NRZI descrambling or SDI framing or alignment control. Although SDI framing/alignment control as disclosed herein is handled in the programmable FPGA fabric rather than in an FPGA receiver itself, the alignment controller 528 could be used to control bit-slip by asserting the same signal that is used in FPGA receiver-based alignment control schemes. This provides for SDI framing/alignment control using a signaling mechanism that is supported by an FPGA receiver rather than implementing a custom interface for feeding back an alignment control signal (in this case a bit-slip control signal) from the programmable FPGA fabric to the FPGA receiver. Even though the actual asserted control signal could be the same in embodiments disclosed herein and in FPGA receiver-based alignment control, the control mechanism is different (FPGA fabric-based) in the embodiments disclosed herein.

Figure 5B:
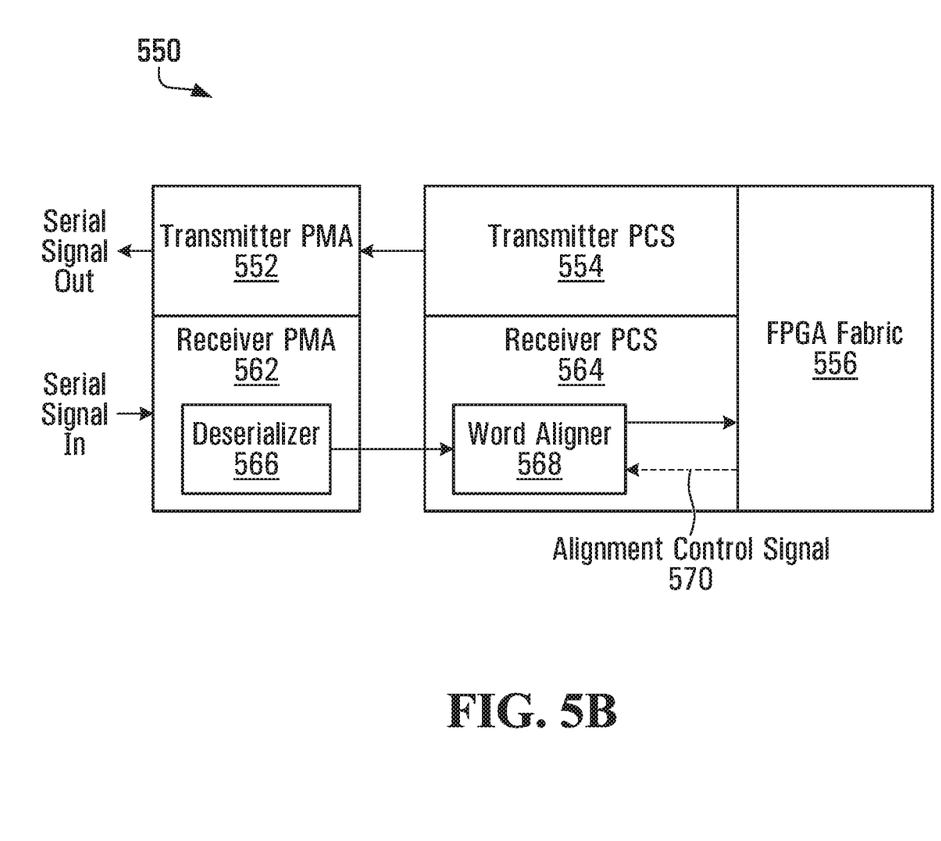
FIG. 5B is a block diagram illustrating an example FPGA device that could be used in implementing the example FPGA-based SDI receiver of FIG. 5A.

In the example SDI receiver 500, the alignment control signal is fed back to the FPGA transceiver 510. For illustrative purposes, an example FPGA device that could be used in implementing the FPGA-based SDI receiver 500 is shown in FIG. 5B. The example FPGA device 550 includes an FPGA transceiver with an FPGA transmitter and an FPGA receiver. The FPGA transmitter includes a transmitter PMA 552 and a transmitter PCS 554, and the FPGA receiver includes a receiver PMA 562 and a receiver PCS 564. Thus, the FPGA transmitter and the FPGA receiver in this example each include PMA and PCS blocks. The PMA block serializes parallel signals for transmission and deserializes received serial signals. In the PCS block, parallel signals are processed between the PMA block and the FPGA core, represented in FIG. 5B as the FPGA fabric 556.

Only internal elements of the receiver PMA 562 and the receiver PCS 564 in the example FPGA device 550 which are relevant to alignment control as disclosed herein are shown in FIG. 5B. These components include various internal elements that are configurable to build complete transmit and receive datapaths in the FPGA device 550. The embodiments disclosed herein need not impact a transmit datapath at all, and therefore no internal elements of the transmitter PMA 552 or the transmitter PCS 554 are shown in FIG. 5B. The deserializer 566 and the word aligner 568 are relevant to framing/alignment control as disclosed herein and therefore are shown in FIG. 5B, but the receiver PMA 562 and the receiver PCS 564 may include additional components as well.

The FPGA device 550 could be used to implement the example SDI receiver 500 shown in FIG. 5A. The FPGA transceiver 510 (FIG. 5A) could include the transmitter and receiver PMA and PCS blocks 552, 554, 562, 564. The NRZI descrambler 522, the phase detector 530, and the alignment controller 528 are all implemented in FPGA fabric 520 in FIG. 5A, and could similarly be implemented in the FPGA fabric 556 in the example FPGA device 550 in FIG. 5B.

The alignment control signal 570 in FIG. 5B represents the control signal that is fed back from the alignment controller 528 (FIG. 5A) to the FPGA transceiver 510. In the example shown in FIG. 5B, the alignment control signal 570 is fed back to the word aligner 568. In an embodiment, the word aligner 568 is configured to operate in a bit-slip mode, and the alignment control signal 570 is a bit-slip control signal that is asserted to control the word aligner 568 to drop one bit at a time until the number of bits determined by the phase detector in the FPGA fabric 556 have been dropped. The word aligner 568 could also be configurable to detect known code words and bit patterns to determine word boundaries when a signal is deserialized, as in the case of certain telecommunication standards for example, and in such implementations an FPGA transceiver itself can internally drive an alignment control signal such as a bit-slip control signal. However, this type of "internal" alignment mechanism embedded into an FPGA transceiver, might not be available for all communication standards. The present disclosure provides an alternate FPGA fabric-based mechanism for alignment control, and in an embodiment the word aligner 568 is a configurable word aligner that is configured for bit-slip operation even though in other implementations it could search for known code words and bit patterns associated with other telecommunication standards.

In a bit-slip implementation, word alignment in the word aligner 568 "slips" along the sequence of bits that were received in the incoming serial signal. Although the deserializer 566 outputs a parallel signal for processing by the word aligner 568, each parallel word includes a sequence of bits from the received serial signal. Thus, even though the word aligner 568 operates on a parallel signal in an embodiment, bit-slipping involves slipping word alignment along the bits in the serial bitstream and in effect drops bits from that serial bitstream.

The word aligner 568 relates to one embodiment. Alignment could instead be provided by the deserializer 566 itself, or by another component such as a dedicated bit-slip block in an FPGA transceiver. In any case, the alignment controller 528 (FIG. 5A) feeds back an alignment control signal to an FPGA receiver, which in most embodiments will likely be part of an FPGA transceiver such as 510 or as shown in FIG. 5B.

In an embodiment, this feedback alignment control signal instructs the FPGA transceiver 510, or specifically the word aligner 568 in the example shown in FIG. 5B, to perform a number of "bit-slip" operations, which will adjust the phase of deserialized words generated by the deserializer 566 of the FPGA transceiver. By bit-slipping the number of bits of measured phase error in the phase detector 530 (FIG. 5A), the subsequent re-aligned data words output by the word aligner 568 will be phase aligned. This implementation does not require the large barrel shifter 414 (FIG. 4) which implements phase alignment in the SDI receiver 400. In one implementation, this resulted in a 33% reduction in framer logic (to implement the phase detector 530 and alignment controller 528 without the barrel shifter 414) and an 18% reduction of the overall SDI receiver logic (to implement framer logic without the barrel shifter, but including additional logic for further down-stream processing such as video synchronization, format detection, error detection, checksum calculation). Other implementations may exhibit similar or different results.

Examples of FPGA-based SDI receivers 300, 500 in accordance with two embodiments are described above with reference to FIGS. 3 and 5A, and an example FPGA device is described with reference to FIG. 5B. All of these are examples of an FPGA device that includes an FPGA receiver and programmable FPGA fabric 330, 520, 556. The FPGA receiver could be part of an FPGA transceiver as shown at 320, 510, and 562/564, and is configured to receive a serial signal, to deserialize the received serial signal into a parallel signal, and to align parallel words in the serial signal.

The programmable FPGA fabric 330, 520, 556 is in each case coupled to receive the parallel signal from the FPGA receiver, and configured to descramble data words from the parallel words in the parallel signal. Descrambling is shown at 332 in FIG. 3, and the NRZI descrambler 522 is configured in the programmable FPGA fabric 520 in FIG. 5A and could similarly be configured in the FPGA fabric 556 in FIG. 5B. The programmable FPGA fabric 330, 520, 556 is also configured to perform a phase detection operation based on the descrambled data words. Phase detection is shown at 334 in FIG. 3, and a phase detector 530 is configured in the programmable FPGA fabric 520 in FIG. 5A and could similarly be configured in the FPGA fabric 556 in FIG. 5B. The programmable FPGA fabric 330, 520, 556 is also configured to generate an alignment control signal based on the phase detection operation, and to feed back the alignment control signal to the FPGA receiver to control alignment of the parallel words in the parallel signal. The alignment control signal is shown in FIG. 3 as a feedback signal from the phase detection at 334 to the deserialization at 326. In the example SDI receiver 500 in FIG. 5A, the alignment controller 528 generates and feeds back the alignment control signal to the FPGA transceiver 510. In the example FPGA device 550, the alignment control signal 570 is fed back from the FPGA fabric 556 to the word aligner 568.

The phase detection operation that the programmable FPGA fabric is configured to perform includes, in one embodiment, detection of an alignment pattern in the descrambled data words and determination of a phase difference between a phase of the alignment pattern and a current alignment of the parallel words in the parallel signal. The alignment control signal is generated based on the phase difference. An example of this is described above with reference to the phase detector 530 in FIG. 5A, in which the phase difference is determined from the position of the comparator which detects the alignment pattern (a TRS in that example) and the alignment controller 528 generates the alignment control signal based on the phase difference.

The alignment control signal could be generated to control a number of bits to be dropped from the serial signal by the FPGA receiver. As noted above, the alignment control signal could be a control signal that is asserted to control a bit-by-bit shift until the appropriate number of bits have been dropped. In other embodiments, the alignment control signal could be a signal that specifies the number of bits to be dropped.

In the example FPGA device 550 shown in FIG. 5B, the FPGA receiver is part of an FPGA transceiver, and includes a deserializer 566 coupled to a word aligner 568. The word aligner 568 has an input to receive the alignment control signal 570, and is configured to perform a bit-slip operation in an embodiment. Word aligners in some FPGA transceivers or receivers are configurable to operate in a bit-slip mode instead of in a mode that searches for an alignment pattern, for example, and in one embodiment a word aligner could be used in bit-slip mode to implement a bit-slip operation. In other embodiments, a bit-slip operation could be implemented in other ways, such as in a bit-slip device that is not part of a word aligner.

In embodiments in which the incoming serial signal is an SDI signal, the programmable FPGA fabric is configured to descramble data words from the deserialized parallel signal using an NRZI descrambling algorithm, such as in the NRZI descrambler 522 in FIG. 5A. Other types of descrambling/decoding could be used in other embodiments.

Alignment timing, in terms of how long it takes to properly word-align a signal, could also be an important consideration, as adjustments in alignment can create discontinuities in a datastream. As defined in SDI standards, and in particular SMPTE RP-168, video streams may be switched within a defined region of the video signal, known as the "switching interval". The SDI standards further specify that no useful data should follow the switching region for a specified period of time. For example, SMPTE ST291-1 specifies that "data packets not be transmitted within an ancillary data space following a vertical interval switching point defined by SMPTE RP 168 for a time period covering the remainder of the switched line and the first horizontal ancillary data space interval subsequent to the switched line". This period spans from the switching interval until a second TRS sequence that immediately follows the switching interval. In order to meet these switching requirements, any processing in the SDI receiver must properly phase-align the words prior to the second TRS sequence which follows this switching interval.

In the example SDI receiver 500 in FIG. 5A and a 4-word 320-bit TRS, the phase detector 530 will find the correct phase in a maximum of 83 cycles from the first TRS since the TRS could only possibly be mis-aligned by up to 80 bits in this example. This occurs well before the second TRS sequence. As noted above, a TRS generally appears only twice per video line, and a video line could include approximately 1900 to over 8000 words. Thus, in this embodiment of a maximum detection time of 83-cycles, an SDI TRS is detected by the programmable FPGA fabric and the alignment control signal is fed back to the FPGA receiver to control alignment of the parallel words in the parallel signal, within a switching interval specified by SMPTE RP-168 and SMPTE ST291-1. Even taking into account the impact of word re-alignment, 80 bits is the maximum possible re-alignment or bit-slip in this example, and the total maximum alignment time of 83 cycles for detection and 80 bits for re-alignment in this example is still within a switching interval.

For example, a video line consists an active portion and a "horizontal blanking" interval. The former makes up the majority of data words in the line (for example in SD this is 1440 samples), and the latter follows with a smaller number (in SD it is 276 samples). The beginning and end of the horizontal blanking region includes a TRS sequence. According to SMPTE RP-168, the switching interval is defined on a specific line (the "switching line"), which varies depending on video format, and shall occur in the "active" portion of the line. In an embodiment, the TRS sequence which prefaces the horizontal blanking region immediately following the switching interval on the switching line is the sequence used for phase alignment. Therefore, the 83-cycle alignment latency noted above, which corresponds to 83 samples, falls well below the remaining 276 samples left in the line before the second TRS at the end of the horizontal blanking. Even with an additional delay of up to 80 cycles/samples for the actual re-alignment, the total alignment latency falls below 276 samples. 276 samples is the smallest value (i.e., worst case) for the width of horizontal blanking. HD, 3G and UHD formats have much wider horizontal blanking intervals.

An SDI TRS is an example of an alignment pattern or signal that is specific to SDI. For other types of serial signals, different alignment patterns or signals could be used.

FIGS. 3, 5A, and 5B and the descriptions thereof relate to FPGA devices that are configured in a certain way to implement embodiments. Other embodiments in the form of methods are also contemplated.

Figure 6:
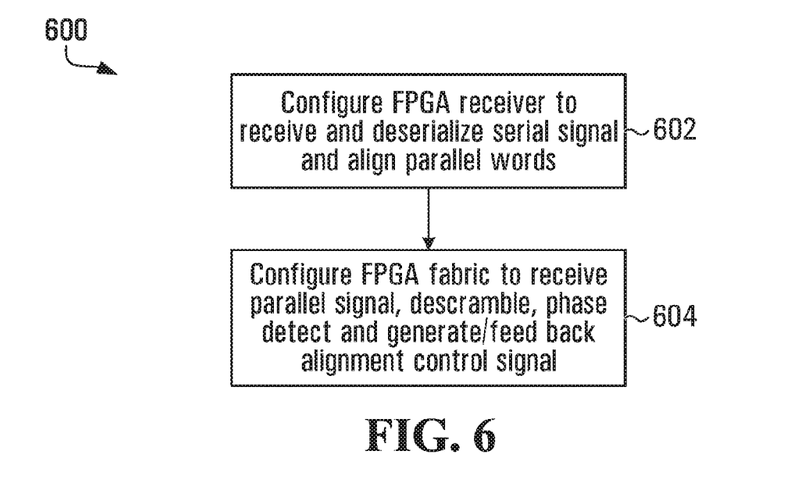
FIG. 6 is a flow diagram illustrating an example method of configuring an FPGA device.

FIG. 6 is a flow diagram illustrating an example method of configuring an FPGA device. The example method 600 involves configuring an FPGA receiver in the FPGA, at 602. The receiver could be part of an FPGA transceiver, depending on the architecture of the FPGA. The FPGA receiver is configured at 602 to receive a serial signal, to deserialize the received serial signal into a parallel signal, and to align parallel words in the parallel signal. At 604, programmable FPGA fabric in the FPGA device is configured to receive the parallel signal from the FPGA receiver, to descramble data words from the parallel words in the parallel signal, to perform a phase detection operation based on the descrambled data words, to generate an alignment control signal based on the phase detection operation, and to feed back the alignment control signal to the FPGA receiver to control alignment of the parallel words in the parallel signal. For an SDI signal, configuring the programmable FPGA fabric to descramble the data words involves configuring the programmable FPGA fabric to apply an NRZI descrambling algorithm. Configuring the programmable FPGA fabric to perform a phase detection operation could involve configuring the programmable FPGA fabric to detect an alignment pattern in the descrambled data words and determine a phase difference between a phase of the alignment pattern and a current alignment of the parallel words in the parallel signal. Configuring the programmable FPGA fabric to generate the alignment control signal could involve configuring the programmable FPGA fabric to generate the alignment control signal to control a number of bits to be dropped from the serial signal by the FPGA receiver.

The example method 600 is illustrative of one embodiment. The operations in FIG. 6 could be performed in a different order, or concurrently as part of the same FPGA load. Further variations, including additional operations that could be performed in other embodiments or different ways of performing operations may be or become apparent from FIGS. 3, 5A, and 5B and the descriptions thereof, for example.

Figure 7:
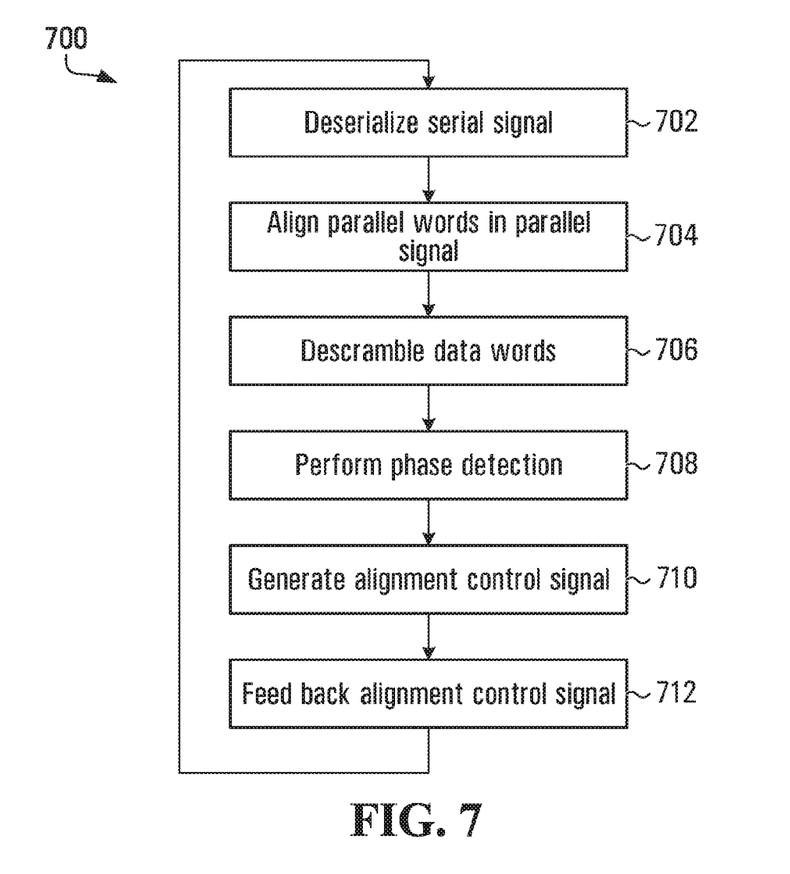
FIG. 7 is a flow diagram illustrating another example method.

FIG. 7 is a flow diagram illustrating another example method. The example method 700 involves deserializing a serial signal into a parallel signal, at 702. The deserializing at 702 is performed by an FPGA receiver in an FPGA device. At 704, alignment of parallel words in the parallel signal is controlled, and this is also performed by the FPGA receiver. This could involve performing a bit-slip operation to drop a number of bits according to an alignment control signal.

The other operations shown in FIG. 7 are performed by programmable FPGA fabric in the FPGA device. These other operations include descrambling data words from the parallel words in the parallel signal at 706, performing a phase detection operation at 708 based on the descrambled data words, generating an alignment control signal at 710 based on the phase detection operation, and feeding back the alignment control signal to the FPGA receiver at 712 to control alignment of the parallel words in the parallel signal.

For an SDI signal as the serial signal, the descrambling at 704 involves descrambling the data words using an NRZI descrambling algorithm. Performing a phase detection operation at 708 could involve detecting an alignment pattern in the descrambled data words and determining a phase difference between a phase of the alignment pattern and a current alignment of the parallel words in the parallel signal. The alignment control signal could then be generated at 710 based on the phase difference. In an embodiment, the alignment control signal controls a number of bits to be dropped from the serial signal by the FPGA receiver.

An SDI TRS is an example of an alignment pattern or signal that could be detected by the programmable FPGA fabric. In an embodiment, the SDI TRS is detected and the alignment control signal is fed back to the FPGA receiver to control alignment of the parallel words in the parallel signal, within a switching interval specified by SMPTE RP-168 and SMPTE ST291-1.

As noted above with reference to FIG. 6, the example method 700 in FIG. 7 is illustrative of one embodiment. Variations, including additional operations that could be performed in other embodiments or different ways of performing operations, may be or become apparent from FIGS. 3, 5A, and 5B and the descriptions thereof, for example.

The present disclosure deals with the interface of serial signals, including digital video signals, to FPGA devices. Techniques for word-aligning or framing SDI signals within an FPGA are disclosed. In some embodiments, the bit-slip control within an FPGA transceiver core is manipulated based on a fabric-based phase detector in the FPGA programmable fabric. A costly barrel shifter that is used for word alignment in other implementations is thus avoided. Word alignment timing that satisfies the requirements of such standards as SMPTE RP-168 and SMPTE ST291-1 may be especially preferred in video processing applications.

What has been described is merely illustrative of the application of principles of embodiments of the present disclosure. Other arrangements and methods can be implemented by those skilled in the art.

For example, FIGS. 3, 5A, and 5B are intended solely for illustrative purposes, and other implementations could include additional, fewer, and/or different elements or components. As noted above, an FPGA receiver could be part of an FPGA transceiver, and similarly a deserializer could be part of serializer/deserializer (SERDES) for instance. Other embodiments could be different than shown in the drawings.

In addition, although described primarily in the context of FPGA devices and methods, other implementations are also contemplated, as instructions stored on a non-transitory computer-readable medium, for example.

We claim:
1. A Field Programmable Gate Array (FPGA) device comprising:
an FPGA receiver configured to receive a serial signal, to deserialize the received serial signal into a parallel signal, and to align parallel words in the parallel signal;
an FPGA fabric coupled to receive the parallel signal from the FPGA receiver, and configured to descramble data words from the parallel words in the parallel signal, to perform a phase detection operation based on the descrambled data words, to generate an alignment control signal based on the phase detection operation, and to feed back the alignment control signal to the FPGA receiver to control alignment of the parallel words in the parallel signal.

2. The FPGA device of claim 1,
wherein the phase detection operation comprises detection of an alignment pattern in the descrambled data words and determination of a phase difference between a phase of the alignment pattern and a current alignment of the parallel words in the parallel signal,
wherein the FPGA fabric is configured to generate the alignment control signal based on the phase difference.

3. The FPGA device of claim 2, wherein the FPGA fabric is configured to generate the alignment control signal to control a number of bits to be dropped from the serial signal by the FPGA receiver.

4. The FPGA device of claim 3, wherein the FPGA receiver comprises a word aligner and a deserializer coupled to the word aligner, the word aligner having an input to receive the alignment control signal and being configured to perform a bit-slip operation.

5. The FPGA device of claim 1, wherein the serial signal is a Serial Digital Interface (SDI) signal.

6. The FPGA device of claim 5, wherein the FPGA fabric is configured to descramble the data words using a Non-Return-to-Zero-Inverted (NRZI) descrambling algorithm.

7. The FPGA device of claim 2, wherein the serial signal is a Serial Digital Interface (SDI) signal, and wherein the alignment pattern is an SDI Timing Reference Signal (TRS).

8. The FPGA device of claim 7,
wherein the SDI TRS is detected by the FPGA fabric and the alignment control signal is fed back to the FPGA receiver to control alignment of the parallel words in the parallel signal, within a switching interval specified by SMPTE RP-168 and SMPTE ST291-1 standard.

9. A method of configuring a Field Programmable Gate Array (FPGA) device, the method comprising:
configuring an FPGA receiver in the FPGA device to receive a serial signal, to deserialize the received serial signal into a parallel signal, and to align parallel words in the parallel signal;
configuring an FPGA fabric in the FPGA device to receive the parallel signal from the FPGA receiver, to descramble data words from the parallel words in the parallel signal, to perform a phase detection operation based on the descrambled data words, to generate an alignment control signal based on the phase detection operation, and to feed back the alignment control signal to the FPGA receiver to control alignment of the parallel words in the parallel signal.

10. The method of claim 9,
wherein configuring the FPGA fabric to perform a phase detection operation comprises configuring the FPGA fabric to detect an alignment pattern in the descrambled data words and determine a phase difference between a phase of the alignment pattern and a current alignment of the parallel words in the parallel signal, wherein configuring the FPGA fabric to generate the alignment control signal comprises configuring the FPGA fabric to generate the alignment control signal to control a number of bits to be dropped from the serial signal by the FPGA receiver.

11. The method of claim 10, wherein the serial signal is a Serial Digital Interface (SDI) signal.

12. The method of claim 11, wherein configuring the FPGA fabric to descramble the data words comprises configuring the FPGA fabric to apply a Non-Return-to-Zero-Inverted (NRZI) descrambling algorithm.

13. A method comprising:
deserializing, by a Field Programmable Gate Array (FPGA) receiver in an FPGA device, a serial signal received by the FPGA receiver, the FPGA receiver deserializing the serial signal into a parallel signal;
controlling, by the FPGA receiver, alignment of parallel words in the parallel signal;
descrambling, by an FPGA fabric in the FPGA device, data words from the parallel words in the parallel signal;
performing, by the FPGA fabric, a phase detection operation based on the descrambled data words;
generating, by the FPGA fabric, an alignment control signal based on the phase detection operation;
feeding back, by the FPGA fabric, the alignment control signal to the FPGA receiver to control alignment of the parallel words in the parallel signal.

14. The method of claim 13,
wherein performing a phase detection operation comprises detecting an alignment pattern in the descrambled data words and determining a phase difference between a phase of the alignment pattern and a current alignment of the parallel words in the parallel signal,
wherein generating comprises generating the alignment control signal based on the phase difference.

15. The method of claim 14, wherein generating comprises generating the alignment control signal to control a number of bits to be dropped from the serial signal by the FPGA receiver.

16. The method of claim 15, further comprising:
performing, by the FPGA receiver, a bit-slip operation.

17. The method of claim 13, wherein the serial signal is a Serial Digital Interface (SDI) signal.

18. The method of claim 17, wherein descrambling comprises descrambling the data words using a Non-Return-to-Zero-Inverted (NRZI) descrambling algorithm.

19. The method of claim 14, wherein the serial signal is a Serial Digital Interface (SDI) signal, and wherein the alignment pattern is an SDI Timing Reference Signal (TRS).

20. The method of claim 19,
wherein the SDI TRS is detected by the FPGA fabric and the alignment control signal is fed back to the FPGA receiver to control alignment of the parallel words in the parallel signal, within a switching interval specified by SMPTE RP-168 and SMPTE ST291-1 standard.

* * * * *